United States Patent
Lalam et al.

(10) Patent No.: US 11,902,939 B2
(45) Date of Patent: Feb. 13, 2024

(54) COMMUNICATION CHANNEL SELECTION METHOD

(71) Applicant: SAGEMCOM BROADBAND SAS, Rueil Malmaison (FR)

(72) Inventors: Massinissa Lalam, Rueil Malmaison (FR); Laurent Alarcon, Rueil Malmaison (FR)

(73) Assignee: SAGEMCOM BROADBAND SAS, Bois-Colombes (FR)

( * ) Notice: Subject to any disclaimer, the term of this patent is extended or adjusted under 35 U.S.C. 154(b) by 161 days.

(21) Appl. No.: 17/331,677

(22) Filed: May 27, 2021

(65) Prior Publication Data

US 2021/0377915 A1    Dec. 2, 2021

(30) Foreign Application Priority Data

May 27, 2020    (FR) ...................................... 2005572

(51) Int. Cl.
*H04W 72/02* (2009.01)
*H04W 72/0453* (2023.01)
(Continued)

(52) U.S. Cl.
CPC ....... *H04W 72/02* (2013.01); *H04W 72/0453* (2013.01); *H04W 72/542* (2023.01); *H04W 88/14* (2013.01)

(58) Field of Classification Search
CPC ............. H04W 72/02; H04W 72/0453; H04W 72/542; H04W 88/14
See application file for complete search history.

(56) References Cited

U.S. PATENT DOCUMENTS 10,992,398 B1 *  4/2021  Myers ...................... H04B 7/01
2015/0197010 A1 *  7/2015  Ruuspakka ............ B25J 9/1664
                                                                  700/245

(Continued)

FOREIGN PATENT DOCUMENTS

EP          2907334 A1      8/2015
WO       2014/058366 A1    4/2014

OTHER PUBLICATIONS

Dec. 10, 2020 Search Report issued in French Application No. 2005572.

*Primary Examiner* — Ricky Q Ngo
*Assistant Examiner* — Kabir U Jahangir
(74) *Attorney, Agent, or Firm* — Williams Mullen; R. Brian Drozd (57) ABSTRACT

A wireless communication network that includes a backhaul network interconnecting node devices for extending a radio coverage of a wireless fronthaul network by using a plurality of access points of the wireless fronthaul network, the communication channel is used for interconnecting said node devices. A node device of the backhaul network makes an evaluation of the transmission conditions of its radio environment; calculates a score representing a quality of transmission via this communication channel; transmits to said master node device a message requesting change of communication channel of the backhaul network when at least one other communication channel has obtained a better score than the communication channel selected by the master node device. On reception of the message, master node device obtains scores for the other node devices, and decides to change, or not, communication channel used in the backhaul network according to the scores obtained.

16 Claims, 4 Drawing Sheets

(51) Int. Cl.
*H04W 88/14* (2009.01)
*H04W 72/542* (2023.01)

(56) References Cited

U.S. PATENT DOCUMENTS

| | | | |
|---|---|---|---|
| 2015/0334612 A1* | 11/2015 | Ray Chaudhuri | H04W 36/20 |
| | | | 455/437 |
| 2018/0310279 A1* | 10/2018 | Pathak | H04W 16/02 |
| 2019/0281608 A1* | 9/2019 | Huang | H04W 16/00 |
| 2020/0119836 A1 | 4/2020 | Lyu et al. | |
| 2021/0235460 A1* | 7/2021 | Bendigeri | H04W 84/12 |

* cited by examiner

COMMUNICATION CHANNEL SELECTION METHOD

TECHNICAL FIELD

The present invention relates to a method for selecting a communication channel in a wireless communication network. More particularly, the present invention finds its application in radio coverage extension systems.

PRIOR ART

In local area networks LAN, radio coverage extension systems may be used in order to increase the range of these local area networks LAN by coordinating a plurality of access points AP distributed in space. These various access points AP are integrated in communication node devices, also referred to as extenders, interconnected by means of a backhaul network, and all make available the same wireless local area network WLAN. All these access points AP thus use the same network identifier, called a service set identifier SSID in the terminology of the IEEE 802.11 family of standards on which Wi-Fi (registered trade mark) technology is based, for example "my home", and the same password (also referred to as security key). Fronthaul network can then be spoken of, to which user equipment is intended to be connected. Thus extension of radio coverage is transparent for this user equipment connected to the wireless local area network WLAN. It should be noted that, in some implementations (for example "easyMesh"), the fronthaul network may be used as a backhaul network.

In residential environments, a residential gateway provides access to a wide area network WAN such as the Internet, for terminals that are directly connected to it via local area network LAN interfaces that are either cabled (e.g. Ethernet) or wireless (e.g. Wi-Fi (registered trade mark)) installed in the residential gateway, or indirectly via a radio coverage extension system as mentioned above. Thus the residential gateway integrates one or more access points AP that typically operate on frequency bands at 2.4 GHz and 5 GHz, and soon at 6 GHz. These access points AP are operated by radio interfaces, each radio interface being dedicated to one of said frequency bands and being able to contain one or more access points AP. Each radio interface selects at least one position communication channel predefined on the frequency band concerned. Typically, a first communication channel, referred to as the primary channel, is selected to broadcast beacons of all the access points AP that the radio interface contains, and one or more complementary communication channels (generally adjacent to the primary channel), referred to as secondary channels, are selected in order to allow an increase in communication bit rate by aggregating communication capacities. Each access point AP is identified in the beacons that concern it by a unique identifier, referred to as a basic service set identifier BSSID in the terminology of the IEEE 802.11 family of standards.

When the backhaul network is in place, a node device (called the "parent") establishes a first access point AP (for the backhaul network) via at least one of its radio interfaces, and one or more other node devices (called "children") connect thereto by means of a station functionality, as user equipment would do with respect to a conventional access point AP. A child node device uses a radio interface matching the radio interface that implements the first access point AP of the parent node device. This radio interface of the child node device may itself integrate a second access point AP to extend the coverage of the backhaul network, so that other node devices of the backhaul network can connect thereto in their turn. Then the second access point AP (belonging to the backhaul network) uses the same communication channel, namely the same primary channel, as the one imposed by the first access point AP on the station functionality of the radio interface that integrates the second access point AP. If another access point AP is also established by the same radio interface for the fronthaul network, then the same communication channel, namely the same primary channel, is also used by this other access point AP (because it belongs to the same radio interface).

The backhaul network is coordinated by a communication node device, referred to as the master node device. In residential environments, the role of the master node device is generally fulfilled by the residential gateway, this having a strategic position of concentrating data flows with respect to access to the wide area network WAN and having available in particular more processing capacities than simple extenders (the residential gateway also being able to be considered, from the point of view of the backhaul network, as an extender).

Thus, when the master node device selects a communication channel, this affects the whole of the backhaul network so that all the access points AP forming the backhaul network use this communication channel. Typically, all these access points AP have the same primary channel, provided that it is the same type of radio interface (e.g. at 5 GHz) that is used for supporting the backhaul network.

However, the master node device selects this communication channel according to the information that it has available locally (scan of its own radio environment, noise level, interference, etc.), generally referred to as an automatic channel selection ACS mechanism, and, as this selection does not take account of the radio environments particular to the other node devices of the backhaul network, this selection of communication channel may not be satisfactory from the point of view of at least one other node device of the backhaul network, which may impair the performance (bit rate, retransmissions, etc.) of the wireless local area network WLAN the coverage of which is extended.

It is therefore desirable to overcome these drawbacks of the prior art. It is in particular desirable to provide a solution that makes it possible to improve the performance (bit rate, retransmissions, etc.) of a wireless local area network WLAN comprising a backhaul network, as mentioned above, which is intended to extend the radio coverage of said wireless local area network WLAN.

DISCLOSURE OF THE INVENTION

A first method is proposed for selecting a communication channel in a wireless communication network comprising a backhaul network interconnecting node devices and intended to extend a radio coverage of a wireless fronthaul network by using a plurality of access points of the wireless fronthaul network. The same first communication channel, selected by a master node device of the backhaul network, is used in the backhaul network to interconnect said node devices. The method comprises the following steps performed by each node device of the backhaul network: making an evaluation of transmission conditions of its radio environment; calculating, for each communication channel available to said node device, a score representing a quality of transmission via said communication device according to the evaluation made. In addition, when, from the point of view of a said node device of the backhaul network, at least one second communication channel shows a better score than the first communication channel, the method further comprises the following steps performed by the master node device: obtaining, from each node device of the backhaul network, the score of the first communication channel and the score of at least one said second communication channel, to make an evaluation of change of communication channel; deciding to change, or not, communication channel used in the backhaul network, according to the scores obtained. Thus the performance (bit rate, retransmissions, etc.) of a wireless communication network the radio coverage of which is extended by such a backhaul network is improved by means of taking into account, via the scores, the radio environments of the various node devices of the backhaul network. In addition, by passing through calculations of scores, the volume of information/data exchanged in the backhaul network to enable the communication channel to be selected is limited.

According to a particular embodiment, following the evaluation of transmission conditions of its radio environment, when a node device other than the master node device assesses that at least one second communication channel shows a better score than the first communication channel, the node device in question transmits to said master node device a message requesting change of communication channel including at least an identifier of said at least one second communication channel that obtained the better score and its score, as well as the score obtained by the first communication channel. Then the master node device sounds each of the node devices of the backhaul network other than the one that transmitted said message to request change of communication channel in order to obtain the score of each communication channel to which the message requesting change of communication channel refers. Thus the master node device can evaluate switching to any other communication channel that would be perceived as better from the point of view of the node device that transmitted the message to request change of communication channel.

According to a particular embodiment, the score $S_i$ attributed to each communication channel i is a weighted sum of marks $n_{i,j}$ attributed to various metrics j following the evaluation of the transmission conditions of the radio environment with respect to said communication channel i, using predetermined weights $\alpha_{i,j}$ serving to privilege one metric rather than another for the communication channel i, so that:

$$S_i = \sum_j \alpha_{i,j} \cdot n_{i,j}$$

with $$\forall i, \forall j, \sum_j \alpha_{i,j} = 1$$

Thus the score is easily calculated.

According to a particular embodiment, when a metric is not observable for the communication channel i, a maximum mark is attributed to said metric, or said metric is taken out of the score calculation without adjusting the weight of the other metrics, or said metric is taken out of the score calculation while proportionally adjusting the weights of the other metrics in order to ensure that the sum thereof is equal to 1. Thus different metrics for different communication channels and/or for different node devices are easily taken into account.

According to a particular embodiment, the metrics are selected from: an ambient noise level for the communication channel i; a quantity of access points detected on the communication channel i, apart from access points of the backhaul network; a proportion of the time where the communication channel i is seen as free; a proportion of packets retransmitted; a quantity of access points, apart from access points of the backhaul network, using a communication channel adjacent to the communication channel i; a quantity of access points, apart from access points of the backhaul network, detected with a power above a predetermined threshold. Thus the field of the possible metrics is vast.

According to a particular embodiment, the master node device determines the gain or loss $\delta_{c \to t}(k)$, for each node device k, in switching from the first communication channel c to a target second communication channel t in the following manner:

$$\delta_{c \to t}(k) = s_t(k) - s_c(k)$$

where $s_t(k)$ is the score for the first communication channel c and $s_t(k)$ is the score for the target second communication channel t.

According to a particular embodiment, the master node device estimates the gain or the loss in using the target second communication channel t in place of the first communication channel c for the whole of the backhaul network, by means of a cost function as follows:

$$\Delta_{c \to t} = \sum_k \gamma_k \delta_{c \to t}(k) = \sum_k \gamma_k (s_r(k) - s_c(k))$$

where $\gamma_k$ are weighting coefficients defined in order to take into account the type of traffic taking place on the first communication channel c, as reported by each node device k of the backhaul network. Thus it is possible easily to prioritise the selection of the appropriate communication channel according to the traffic concerned.

According to a particular embodiment, when the master node device has decided to change, or not, communication channel for the backhaul network, the node device that initiated the evaluation of change of communication channel triggers a time delay, during which it is not enabled to initiate a new evaluation of change of communication channel. Thus any unwanted demands to change communication channel are avoided.

According to a particular embodiment, the master node device performs the following steps: exchanging with the other node devices of the backhaul network to harvest information on the abilities to measure such and such a metric; selecting the metrics applicable for the calculations of scores according to said information; informing the other node devices of the backhaul network on the metrics to be used for the calculations of scores. Thus the metrics to be used can be dynamically defined.

According to a particular embodiment, the fronthaul network and the backhaul network use radio interfaces of the Wi-Fi type.

A second method is also proposed for selecting a communication channel in a wireless communication network comprising a backhaul network interconnecting node devices and intended to extend a radio coverage of a wireless fronthaul network by using a plurality of access points of the wireless fronthaul network. The same first communication channel, selected by a master node device of the backhaul network, is used in the backhaul network to interconnect said node devices. The method comprises the following steps performed by a node device of the backhaul network other than the master node device; making an evaluation of transmission conditions of its radio environment; calculating, for each communication channel available to said node device, a score representing a quality of transmission via said communication channel according to the evaluation made; when at least one second communication channel shows a better score than the first communication channel, initiating, with said master node device, an evaluation of change of communication channel in favour of a said second communication channel; awaiting a decision of the master node device to change, or not, communication channel used in the backhaul network.

A third method is also proposed for selecting a communication channel in a wireless communication network comprising a backhaul network interconnecting node devices and intended to extend a radio coverage of a wireless fronthaul network by using a plurality of access points of the wireless fronthaul network. The same first communication channel, selected by a master node device of the backhaul network, is used in the backhaul network to interconnect said node devices. The method comprises the following steps performed by the master node device: making an evaluation of transmission conditions of its radio environment; calculating, for each communication channel available to said master node device, a score representing a quality of transmission via said communication channel according to the evaluation made. In addition, when, from the point of view of the master node device or of another node device of the backhaul network, at least one second communication channel shows a better score than the first communication channel, the third method further comprises the following steps performed by the master node device: obtaining, from each other node device of the backhaul network, the score of the first communication channel and the score of at least one said second communication channel, to make an evaluation of change of communication channel; deciding to change, or not, communication channel used in the backhaul network according to the scores obtained.

A computer program product is also proposed, comprising instructions for implementing, by a processor, the second method or the third method, when said program is executed by said processor. An information storage medium is also proposed, storing such a computer program product.

A node device is also proposed, intended to be used in a wireless communication network comprising a backhaul network interconnecting said node device with other node devices and intended to extend a radio coverage of a wireless fronthaul network by using a plurality of access points of the wireless fronthaul network. The same first communication channel, selected by a master node device of the backhaul network, is used in the backhaul network for interconnecting said node devices. The node device in question comprises: means for making an evaluation of transmission conditions of its radio environment; means for calculating, for each communication channel available to said node device, a score representing a quality of transmission via said communication channel according to the evaluation made; when at least one second communication channel shows a better score than the first communication channel, means for initiating, with said master node device, an evaluation of change of communication channel in favour of a said second communication channel; means for awaiting a decision of said master node to change, or not, communication channel used in the backhaul network.

A master node device is also proposed, intended to be used in a wireless communication network comprising a backhaul network interconnecting node devices and intended to extend a radio coverage of a wireless fronthaul network by using a plurality of access points of the wireless fronthaul network. The same communication channel, selected by the master node device, is used in the backhaul network for interconnecting said node devices. The master node device comprises: means for making an evaluation of transmission conditions of its radio environment; means for calculating, for each communication channel available to said master node device, a score representing a quality of transmission via said communication channel according to the evaluation made. In addition, when, from the point of view of the master node device or of another node device of the backhaul network, at least one second communication channel shows a better score than the first communication channel, the master node device further comprises: means for obtaining, from each other node device of the backhaul network, the score of the first communication channel and the score of at least one said second communication channel, for making an evaluation of change of communication channel; means for deciding to change, or not, communication channel used in the backhaul network according to the scores obtained.

According to a particular embodiment, the master node device is a residential gateway.

A wireless communication network comprising a backhaul network interconnecting a master node device and node devices as mentioned above is also proposed, for extending a radio coverage of a wireless fronthaul network by using a plurality of access points of the wireless fronthaul network.

BRIEF DESCRIPTION OF THE DRAWINGS

The features of the invention mentioned above, as well as others, will emerge more clearly from the reading of the following description of at least one example embodiment, said description being made in relation to the accompanying drawings, among which.

DETAILED DISCLOSURE OF EMBODIMENTS

Figure 1:
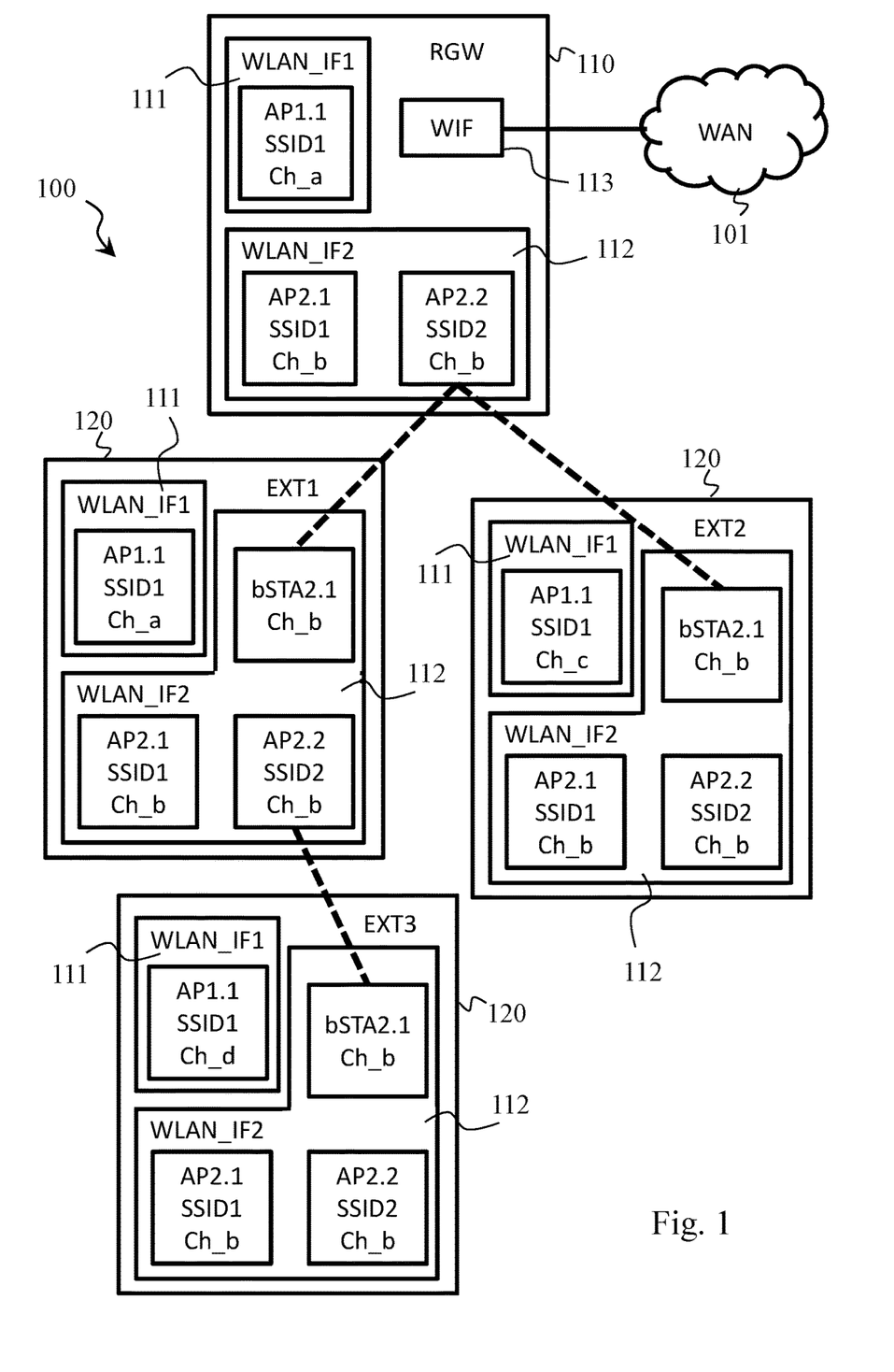
FIG. 1 illustrates schematically an arrangement of a wireless communication network wherein the present invention can be implemented.

FIG. 1 illustrates schematically an arrangement of a wireless communication network wherein the present invention can be implemented. Preferentially, the wireless communication network is a wireless local area network WLAN 100. The wireless local area network WLAN forms a radio coverage extension system constructed around a backhaul network comprising a set of node devices. In the illustrative arrangement in FIG. 1, a first node device is included in a residential gateway RGW 110 and a set of second node devices are included in extenders EXT1, EXT2, EXT3 120. All the extenders EXT1, EXT2, EXT3 120 make it possible to extend the radio coverage of the wireless local area network WLAN 100 with respect solely to the establishment of the residential gateway RGW 110. In one embodiment, the residential gateway RGW 110 and the extenders EXT1, EXT2, EXT3 are arranged to implement a mesh wireless local area network WLAN.

The residential gateway RGW 110 comprises a connection interface WIF 113 designed to connect the residential gateway RGW 110 to a wide area network WAN 101, such as the internet. The connection interface WIF 113 is for example an interface of the ADSL (asynchronous digital subscriber line) type, of the VDSL (very high bit rate digital subscriber line) type or of the FTTH (fibre to the home) type.

The residential gateway RGW 110 fulfils the role of master node device in the backhaul network, but any other node device of the backhaul network may in a variant fulfil the role of master node device. As detailed hereinafter, the master node device chooses the communication channel to be used in the backhaul network.

The residential gateway RGW 110 has a first radio interface WLAN_IF1 111 incorporating an access point AP1.1 forming part of an establishment of a fronthaul network identified by an identifier SSID1 and using a communication channel Ch_a. The residential gateway RGW 110 has a second radio interface WLAN_IF2 112 incorporating an access point AP2.1 and an access point AP2.2. The access point AP2.1 of the second radio interface WLAN_IF2 112 of the residential gateway RGW 110 forms part of the establishment of the fronthaul network identified by the identifier SSID1, and uses a communication channel Ch_b. The access point AP2.2 of the second radio interface WLAN_IF2 112 of the residential gateway RGW 110 forms part of the establishment of the backhaul network, identified by an identifier SSID2, and also uses the communication channel Ch_b. The access points AP2.1 and AP2.2 use the same communication channel Ch_b since they are both installed in the same radio interface WLAN_IF2 112 of the residential gateway RGW 110.

The extender EXT1 120 has a first radio interface WLAN_IF1 111 incorporating an access point AP1.1 forming part of the establishment of the fronthaul network identified by the identifier SSID1 using the communication channel Ch_a. The extender EXT1 120 has a second radio interface WLAN_IF2 112 incorporating a station functionality bSTA2.1 connected via the communication channel Ch_b to the access point AP2.2 of the second radio interface WLAN_IF2 112 of the residential gateway RGW 110 for the establishment of the backhaul network. The second radio interface WLAN_IF2 112 of the extender EXT1 120 also incorporates an access point AP2.1 and an access point AP2.2. The access point AP2.1 of the second radio interface WLAN_IF2 112 of the extender EXT1 120 forms part of the establishment of the fronthaul network identified by the identifier SSID1, and uses the communication channel Ch_b. The access point AP2.2 of the second radio interface WLAN_IF2 112 of the extender EXT1 120 also forms part of the establishment of the backhaul network, identified by the identifier SSID2, and also uses the communication channel Ch_b. The station bSTA2.1 and the access points AP2.1 and AP2.2 use the same communication channel Ch_b since they are all three incorporated in the same radio interface WLAN_IF2 112 of the extender EXT1 120.

The extender EXT2 120 has a first radio interface WLAN_IF1 111 incorporating an access point AP1.1 forming part of the establishment of the fronthaul network identified by the identifier SSID1 using a communication channel Ch_c. The extender EXT2 120 has a second radio interface WLAN_IF2 112 incorporating a station functionality bSTA2.1 connected via the communication channel Ch_b to the access point AP2.2 of the second radio interface WLAN_IF2 112 of the residential gateway RGW 110 for the establishment of the backhaul network. The second radio interface WLAN_IF2 112 of the extender EXT2 120 also incorporates an access point AP2.1 and an access point AP2.2. The access point AP2.1 of the second radio interface WLAN_IF2 112 of the extender EXT2 120 forms part of the establishment of the fronthaul network identified by the identifier SSID1, and uses the communication channel Ch_b. The access point AP2.2 of the second radio interface WLAN_IF2 112 of the extender EXT2 120 also forms part of the establishment of the backhaul network, identified by the identifier SSID2, and also uses the communication channel Ch_b. The station bSTA2.1 and the access points AP2.1 and AP2.2 use the same communication channel Ch_b since they are all three incorporated in the same radio interface WLAN_IF2 112 of the extender EXT2 120.

The extender EXT3 120 has a first radio interface WLAN_IF1 111 incorporating an access point AP1.1 forming part of the establishment of the fronthaul network identified by the identifier SSID1 using a communication channel Ch_d. The extender EXT2 120 has a second radio interface WLAN_IF2 112 incorporating a station functionality bSTA2.1 connected via the communication channel Ch_b to the access point AP2.2 of the second radio interface WLAN_IF2 112 of the extender EXT1 120 for the establishment of the backhaul network. The second radio interface WLAN_IF2 112 of the extender EXT3 120 also incorporates an access point AP2.1 and an access point AP2.2. The access point AP2.1 of the second radio interface WLAN_IF2 112 of the extender EXT3 120 forms part of the establishment of the fronthaul network identified by the identifier SSID1, and uses the communication channel Ch_b. The access point AP2.2 of the second radio interface WLAN_IF2 112 of the extender EXT3 120 also forms part of the establishment of the backhaul network, identified by the identifier SSID2, and also uses the communication channel Ch_b. The station bSTA2.1 and the access points AP2.1 and AP2.2 use the same communication channel Ch_b since they are all three incorporated in the same radio interface WLAN_IF2 112 of the extender EXT2 120.

The radio interfaces WLAN_IF1 111 are for example of the Wi-Fi (registered trade mark) type operating in the 2.4 GHz band, and the radio interfaces WLAN_IF2 112 are for example of the Wi-Fi (registered trade mark) type operating in the 5 GHz band. In some embodiments the radio interfaces WLAN_IF1 111 and WLAN_IF2 112 are respectively compatible with certain amendments of the IEEE 802.11 family of standards. These amendments are for example, and non-limitatively, IEEE 802.11n, IEEE 802.11ac, IEEE 802.11ax, IEEE 802.11be.

The selection of the communication channel Ch_b for supporting the backhaul network is made by the master node device. This selection is then imposed on all the access points AP incorporated in the radio interfaces WLAN_IF2 112, as already explained. The master node device adapts this selection according to exchanges with the other node devices of the backhaul network, as explained below in relation to FIGS. 3A and 3B.

Figure 2:
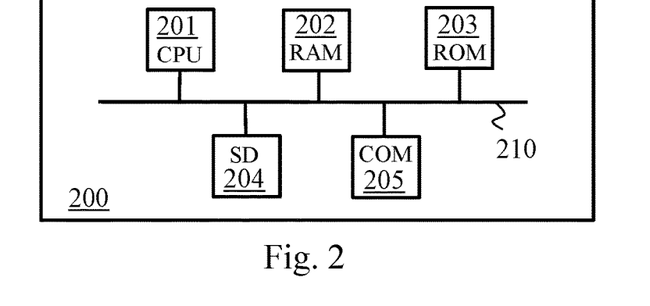
FIG. 2 illustrates schematically an example of a hardware arrangement of a node device that can be used in the context of the wireless communication network of FIG. 1.

FIG. 2 illustrates schematically an example of a hardware arrangement of a node device 200 that can be used in the context of the wireless local area network WLAN 100. The first node device can be implemented according to the example arrangement in FIG. 2. Each of the second node devices can be implemented according to the example arrangement in FIG. 2.

The node device 200 comprises, connected by a communication bus 210: a processor CPU 201; a random access memory RAM 202; a read only memory ROM 203 or a flash memory; a storage unit or a storage medium reader, such as an SD (Secure Digital) card reader 204 or a hard disk HDD (hard disk drive); and at least one communication interface COM 205 (e.g. as illustrated in FIG. 1) that includes the aforementioned radio interfaces.

The processor CPU 201 is capable of executing instructions loaded in the RAM memory 202 from the ROM memory 203 or from the flash memory, from an external memory (such as an SD card), from a storage medium (such as the hard disk HDD), or from a communication network. When the node device 200 is powered up, the processor CPU 201 is capable of reading instructions from the RAM memory 202 and executing them. These instructions form a computer program causing the execution, by the processor CPU 201, of all or some of the behaviours, algorithms and steps described here.

Thus all or some of the behaviours, algorithms and steps described here can be implemented in software form by executing a set of instructions by a programmable machine, such as a DSP (digital signal processor) or a microcontroller or a processor. All or some of the behaviours, algorithms and steps described here can also be implemented in hardware form by a machine or a component (a chip), such as an FPGA (field-programmable gate array) or an ASIC (application-specific integrated circuit). Thus the node device 200 comprises electronic circuitry adapted and configured for implementing the behaviours, algorithms and steps described here.

Figure 3A:
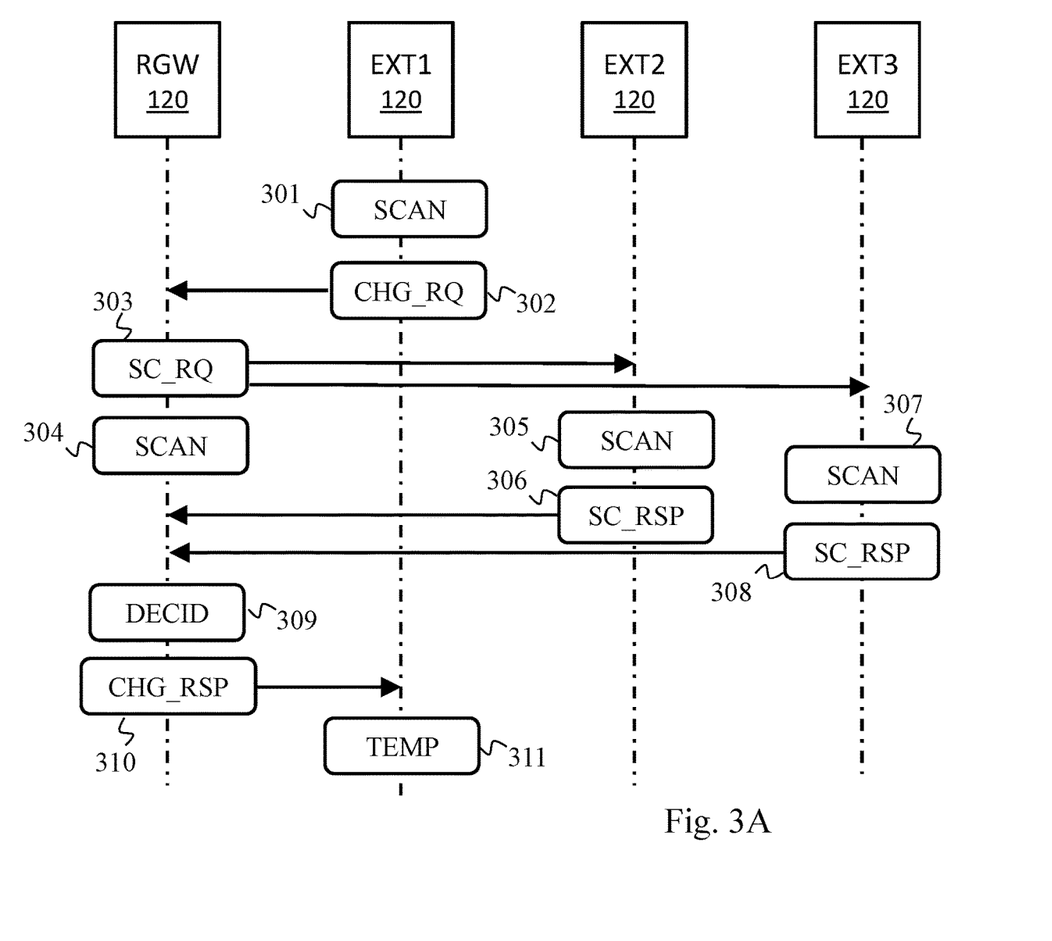
FIG. 3A illustrates schematically a first example of exchanges in the context of a selection of communication channel in the wireless communication network of FIG. 1.

FIG. 3A illustrates schematically an example of exchanges in the context of a communication channel selection in the wireless local area network WLAN 100. More particularly, the exchanges in FIG. 3A take place in the context of a selection of a communication channel to be used for supporting the backhaul network, when a node device of the backhaul network other than the master node device assesses that another communication channel would, from its point of view, be more adapted for supporting the backhaul network and/or a fronthaul network operating on the same channel as said backhaul network in the light of the transmission conditions (sending and/or receiving) of its radio environment.

Before the exchanges in FIG. 3A, a communication channel was selected by the master node device. This communication channel may have been preconfigured, for example in the factory, in the master node device, or selected when the master node device was started up.

Relying on the illustration in FIG. 1, when the access point AP2.2 of the residential gateway RGW 110 is activated, the communication channel Ch_b is used for establishing the backhaul network identified by the identifier SSID2. The station functionality bSTA2.1 of the extender EXT1 120, which is within radio range of the residential gateway RGW 110, recognises the identifier SSID2 broadcast in the beacons sent by the access point AP2.2 of the residential gateway RGW 110 and connects to the access point AP2.2 of the residential gateway RGW 110 via the communication channel Ch_b. Ditto for the station functionality bSTA2.1 of the extender EXT2 120. After exchanges of information necessary for the establishment of the backhaul network (such as the identifier SSID2 and potential security data), the access points AP2.2 of the extenders EXT1 and EXT2 120 are activated, which enables the station functionality bSTA2.1 of the extender EXT3 120, which is within radio range of the extender EXT1 120, to connect to the access point AP2.2 of the extender EXT1 120 via the communication channel Ch_b. Let us consider by way of illustration that the communication channel Ch_b is the communication channel "36".

The node devices of the backhaul network regularly make evaluations of transmission conditions (sending and/or receiving) of their radio environment. Thus, in a step 301, the extender EXT1 120 preferentially performs a scan of its radio environment. This scan comprises operations of scanning various communication channels available for the radio interface WLAN_IF2 112 and of evaluating quality of transmission via these various communication channels by means of one or more predefined metrics. Such metrics are for example an ambient noise level perceptible on the communication channel in question, a quantity of access points AP that do not belong to the backhaul network and which are detected via their beacons sent as using the communication channel in question, a rate of inoccupation or of occupation of the communication channel in question. Other metrics may be used with regard to the communication channel currently used (Ch_b in our example), such as for example a transmission error rate or a retransmission rate. A history of events relating to these metrics can be constructed, with time stamping and management of duration of relevance of said events, in order to enhance or refine these metrics. Yet other metrics may be used, such as the quantity of access points AP (apart from access points AP of the backhaul network) using a communication channel adjacent to the communication channel in question, in order to take into account possibilities of aggregations, or the quantity of access points AP (apart from access points AP of the backhaul network) detected with a power higher than a predetermined threshold, in order to estimate the quantity of adjacent access points AP that are very close (and therefore affecting the transmissions more than the others).

At the end of these evaluations of transmission conditions of their radio environment, the node device in question constructs a descriptor, for example a list or a table, where each communication channel is associated with a score representing a quality of transmission via the communication channel in question. Timestamp information, i.e. indicating when this communication channel was evaluated, is preferentially added thereto. For example, the higher the score, the more the communication channel is judged adequate.

The score $S_i$ attributed to each communication channel i may be a weighted sum of marks $n_{i,j}$ attributed to the various metrics j by the evaluations of conditions of transmission via said communication channel i, the marks $n_{i,j}$ having the same possible amplitude (e.g. from 0 to 100), using predetermined weights $\alpha_{i,j}$ serving to favour one metric rather than another for the communication channel i in question, so that:

$$S_i = \sum_j \alpha_{i,j} \cdot n_{i,j}$$

with $$\forall i, \forall j, \sum_j \alpha_{i,j} = 1$$

It is also possible to apply predefined weights $\alpha_j$ to each metric, independently of the communication channel i evaluated, which gives:

$$S_i = \sum_j \alpha_{i,j} \cdot n_{i,j}$$

with $$\forall j, \sum_j \alpha_{i,j} = 1$$

In a particular embodiment, when a metric is not observable for a communication channel i, the node device in question may attribute to it the maximum mark, or take the metric in question out of the calculation of the score without adjusting the weight of the other metrics, or take the metric in question out of the calculation of the score while proportionally adjusting the weights of the other metrics in order to ensure that the sum thereof is equal to 1.

For example, the following metrics can be considered (with their notation from 0 to 5):

TABLE 1

| Ambient noise level measured in dBm $\mu$ | Mark |
|---|---|
| $-65$ dBm $\leq \mu$ | 0 |
| $-70$ dBm $\leq \mu < -65$ dBm | 1 |
| $-75$ dBm $\leq \mu < -70$ dBm | 2 |
| $-80$ dBm $\leq \mu < -75$ dBm | 3 |
| $-85$ dBm $\leq \mu < -80$ dBm | 4 |
| $\mu < -85$ dBm | 5 |

TABLE 2

| Quantity of access points AP detected $\nu$ (apart from access points of the backhaul network) | Mark |
|---|---|
| $15 \leq \nu$ | 0 |
| $12 \leq \nu < 15$ | 1 |
| $9 \leq \nu < 12$ | 2 |
| $6 \leq \nu < 9$ | 3 |
| $3 \leq \nu < 6$ | 4 |
| $\nu < 3$ | 5 |

TABLE 3

| Proportion of time where the communication channel is seen as free, as a percentage TXOP | Mark |
|---|---|
| TXOP < 5 | 0 |
| $5 \leq$ TXOP $< 25$ | 1 |
| $25 \leq \mu < 45$ | 2 |
| $45 \leq \nu < 65$ | 3 |
| $65 \leq \nu < 85$ | 4 |
| $85 <$ TXOP | 5 |

TABLE 4

| Proportion of packets retransmitted for 100 transmitted packets as percentage $r_{tx}$ | Mark |
|---|---|
| $30 < r_{tx}$ | 0 |
| $25 \leq r_{tx} < 30$ | 1 |
| $20 \leq r_{tx} < 25$ | 2 |
| $15 \leq r_{tx} < 20$ | 3 |
| $10 \leq r_{tx} < 15$ | 4 |
| $r_{tx} < 10$ | 5 |

By considering, still by way of illustration, the following values of the metrics observed on the communication channels "36", "48", "100" (which are not numerical references of the accompanying drawings), the communication channel "36" being, at the time when the evaluations of transmission conditions are made, the communication channel Ch_b configured for the radio interface WLAN_IF2 112 in question:

TABLE 5

| Communication channel | $\mu$ | $\nu$ | TXOP | $r_{tx}$ |
|---|---|---|---|---|
| 36 | $-88$ dBm | 16 | 40% | 33% |
| 48 | $-90$ dBm | 1 | 2% | |
| 100 | $-84$ dBm | 4 | 80% | |

Then, if the same weight is attributed to these metrics for all the communication channels ($\forall i$, $\forall j$, $\alpha_{i,j}=0.25$), and a maximum mark is attributed to a metric that is not known, then the following marks and scores are obtained:

TABLE 6

| Communication channel | mark($\mu$) | mark($\nu$) | mark(TXOP) | mark($r_{tx}$) | score $s_i$ |
|---|---|---|---|---|---|
| 36 | 5 | 0 | 2 | 0 | 1.75 |
| 48 | 5 | 5 | 0 | 5 | 3.75 |
| 100 | 4 | 4 | 4 | 5 | 4.25 |

In FIG. 3A, in a step 301, the extender EXT1 120 makes the aforementioned evaluation of transmission conditions (e.g. scanning operation) and calculates the score $S_i$ attributed to each communication channel i available to its radio interface WLAN_IF2 112. If the communication channel "36" shows a score higher than or equal to that of each of the other communication channels, the extender EXT1 120 waits until it has to reiterate the evaluations of transmission conditions (e.g. scanning operation). In the meantime, the extender EXT1 120 keeps up to date any information necessary to the metrics used for the score calculation $S_i$ (proportion of packets retransmitted on the communication channel "36" etc.). Let us consider that, as illustrated in the above tables, the communication channel "36" shows a score lower than that of at least one other communication channel, here the communication channel "100". Then, in a step 302, the extender EXT1 120 transmits to the residential gateway RGW 110, as master node device, a message CHG_REQ requesting the change of communication channel used by the backhaul network. Thus the extender EXT1 120 does not decide by itself to change the configuration of the access points AP of its radio interface WLAN_IF2 112 to use a better communication channel. It refers this to the master node device.

The message CHG_REQ includes at a minimum information indicating which communication channel has the best score (the target communication channel) for the extender EXT1 120, what its score is, and what the score is of the communication channel currently used. Optionally, the message CHG_REQ includes timestamp information, indicating when each communication channel was evaluated. In a preferential embodiment, the message CHG_REQ lists all the communication channels that have obtained a better score than the communication channel currently used, as well as their respective scores, and does not give the score obtained by each of the communication channels for which this score is less good than that of the communication channel currently used.

Optionally, the message CHG_REQ includes information on the type of current traffic for each communication channel indicated and on the quality of service that is associated therewith. For example, one possible implementation is a bitmap where each bit is associated with a quality of service (of the Best Effort, BE)/Background (BK)/Video (VI)/Voice (VO) type) and is set to 1 if traffic associated with this quality of service has recently taken place (in a predetermined observation window, the duration of observation of which may also be indicated in the message CHG_REQ) and/or is under way, or at 0 otherwise. Instead of one bit per quality of service, the message CHG_REQ may include a counter incremented at each opening of flow associated with this quality of service and decremented at each closure of flow associated with this quality of service or with each group acknowledgement negotiation ("Block Ack agreement" in the terminology of the IEEE 802.11 family of standards) for this quality of service.

Following the sending of the message CHG_REQ, the extender EXT1 120 awaits a decision of the master node device to change, or not, communication channel used in the backhaul network (and consequently on the fronthaul network operated by the same radio interface).

In a step 303, the residential gateway RGW 110 sounds the other node devices in order to determine whether a change in communication channel would be appropriate. To do this, the residential gateway RGW 110 transmits to them a message SC_RQ. The message SC_RQ instructs each node device receiving it to make evaluations of transmission conditions of its radio environment and to return the score of the communication channels concerned. In a particular embodiment, the message SC_RG identifies each communication channel indicated in the message CHG_REQ. The evaluations of transmission conditions are thus limited to the communication channels that can provide a benefit to the extender EXT1 120 and to the communication channel currently used. In another particular embodiment, each node device receiving the message SC_RG must make evaluations of transmission conditions for all the communication channels available to its radio interface WLAN_IF2 112. In yet another particular embodiment, if the node device receiving the message SC_RQ has already made evaluations of transmission conditions for each of the communication channels indicated in the message SC_RQ at an instant t0 prior to the instant t1 of reception of the message SC_RQ and if the difference t1−t0 is below a threshold ΔT preferentially included in the message SC_RQ, then the node device in question returns the score of the communication channels concerned without having to re-evaluate the transmission conditions via said communication channels.

In a step 304, the residential gateway RGW 110 also itself makes the evaluations of transmission conditions (e.g. scanning operation) of its radio environment and makes the calculations of corresponding scores. The extenders EXT2 and EXT3 120 do the same in respective steps 305 and 307. In steps 306 and 308, the extenders EXT2 and EXT3 120 transmit respectively to the residential gateway RGW 110 responses SC_RSP including the scores for the communication channels concerned. The responses SC_RSP preferentially include the same information with respect to said communication channels as the message CHG_REQ (but from the point of view of the extenders EXT2 and EXT3 120).

If the communication channel c is the communication channel currently used (the current communication channel) and the communication channel t is the target communication channel, then the master node device has available, at least, for each node device k, the score $s_c(k)$ for the communication channel c and the score $s_t(k)$ for the communication channel t.

The master node device determines the gain or the loss for all the node devices k to be passed from the communication channel c to the communication channel t in the following manner:

$$\delta_{c \to t}(k) = s_t(k) - s_c(k)$$

If $\delta_{c \to t}(k)$ is positive, then it is advantageous for the node device k to change communication channel used in the radio interface WLAN_IF2 112. On the other hand, if $\delta_{c \to t}(k)$ is negative, then it is disadvantageous for the node device k to change communication channel used in the radio interface WLAN_IF2 112.

Consequently, the master node device estimates the gain in using the communication channel t in place of the communication channel c for the whole of the backhaul network. For example, the following cost function can be evaluated:

$$\Delta_{c \to t} = \sum_k \gamma_k \delta_{c \to t}(k) = \sum_k \gamma_k (s_r(k) - s_c(k))$$

where weighting coefficients $\gamma_k$ are defined in order to take into account the type of traffic currently on the communication channel c, as reported by each node device k. For example: if no traffic $\gamma_k=0$, if BK traffic $\gamma_k=1$, if BE traffic $\gamma_k=2$, if VI traffic $\gamma_k=3$, and if VO traffic $\gamma_k=4$.

Other cost functions may of course be applied, for example by excluding the node device that transmitted the message CHG_REQ from its calculation.

If the cost function $\Delta_{c \to t}$ is negative, then switching onto the communication channel t in place of the communication channel c would not benefit the backhaul network.

In which case, in a step 309, the master node device takes the decision not to accede to the request to change communication channel. In a step 310, the residential gateway RGW 110 then transmits to the extender EXT1 120 a message CHG_RSP representing a negative response to the message CHG_RQ.

Optionally, in a step 311, the extender EXT1 120 triggers a time delay, during which the extender EXT1 120 is not enabled to once again transmit a message CHG_RQ to the master node device. The extender EXT1 120 is thus prevented from making a new demand to change communication channel until the time delay has expired. The time delay may have a predefined duration or a duration fixed by the master node device in the message CHG_RSP. The master node device may furthermore indicate in the message CHG_RSP whether it is instructing the extender EXT1 120 to trigger, or not, said time delay.

It should be noted that the cost function $\Delta_{c \to t}$ may be applied for each communication channel indicated in the message CHG_RQ as having obtained, from the extender EXT1 120, a better score than the communication channel c. If the master node device does not have available scores corresponding to another target communication channel to be verified (since the messages SC_RQ transmitted at the step 303 did not concern this other target communication channel), the master node device reiterates the sendings of messages SC_RQ at least for this other target communication channel. The master node device can proceed thus until it finds, or not, a target communication channel that gives a positive result of the cost function $\Delta_{c \to t}$. If the master node device does not manage to find a target communication channel among those that were listed in the message CHG_RQ that gives a positive result of the cost function $\Delta_{c \to t}$, then the master node device takes the decision not to accede to the request to change communication channel and transmits to the extender EXT1 120 a message CHG_RSP representing a negative response to the message CHG_RQ, as shown in FIG. 3A.

Figure 3B:
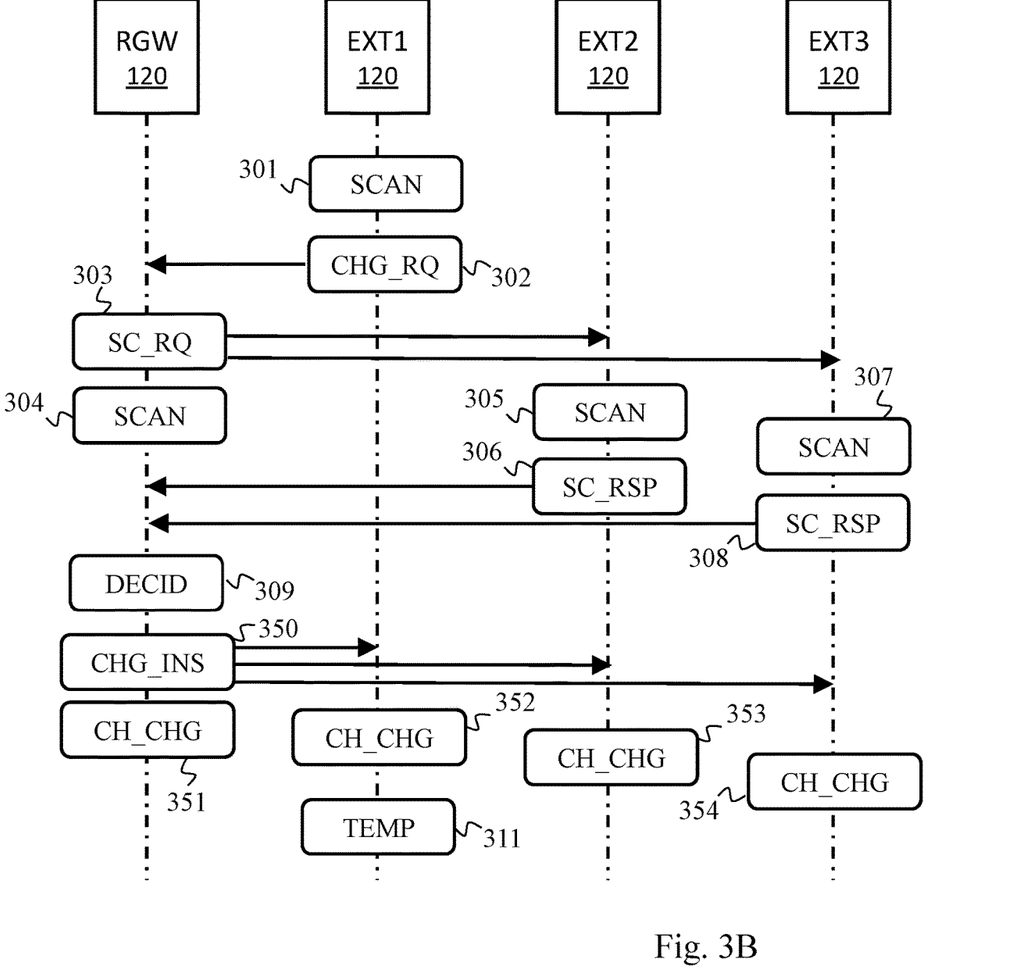
FIG. 3B illustrates schematically a second example of exchanges in the context of a selection of a communication channel in the wireless communication network of FIG. 1.

Unlike the exchanges in FIG. 3A, the exchanges in FIG. 3B present a scenario in which the master node device decides to change communication channel intended to support the backhaul network. FIG. 3B repeats steps 301 to 308 as described above. At the step 309, the master node device has determined that the target communication channel t indicated in the message CHG_RQ would benefit the backhaul network (or one of the target communication channels indicated in the message CHG_RQ) in replacement for the communication channel c. Then the master node device takes the decision to accede to the request to change communication channel. In a step 350, the residential gateway RGW 110 then transmits, to each other node device of the backhaul network, a message CHG_INS instructing to change communication channel and to switch onto the target communication channel that said master node device has adopted. In a step 351, the residential gateway RGW 110 configures its radio interface WLAN_IF2 112 to communicate via said target communication channel adopted in place of the communication channel c. The extenders EXT1, EXT2 and EXT3 120 do likewise in respective steps 352, 353 and 354.

Prior to the transmission of the message CHG_INS, the master node device can transmit to the extender EXT1 120 a message CHG_RSP representing a positive response to the message CHG_RQ. The step 311 is optionally performed by the extender EXT1 after switching of communication channel.

Preferentially, the master node device checks that all the node devices of the backhaul network have indeed applied the change of communication channel for their respective radio interfaces WLAN_IF2 112. The attachments of the node devices to each other may have changed following this change of communication channel, that is to say the backhaul network has changed topology. If at least one node device is missing following the change in communication channel, then the master node device can either instruct to return to the communication channel previously used to leave a chance for each node device to rejoin the backhaul network, or the master node device can decide to continue to operate on the newly configured communication channel.

Figure 4:
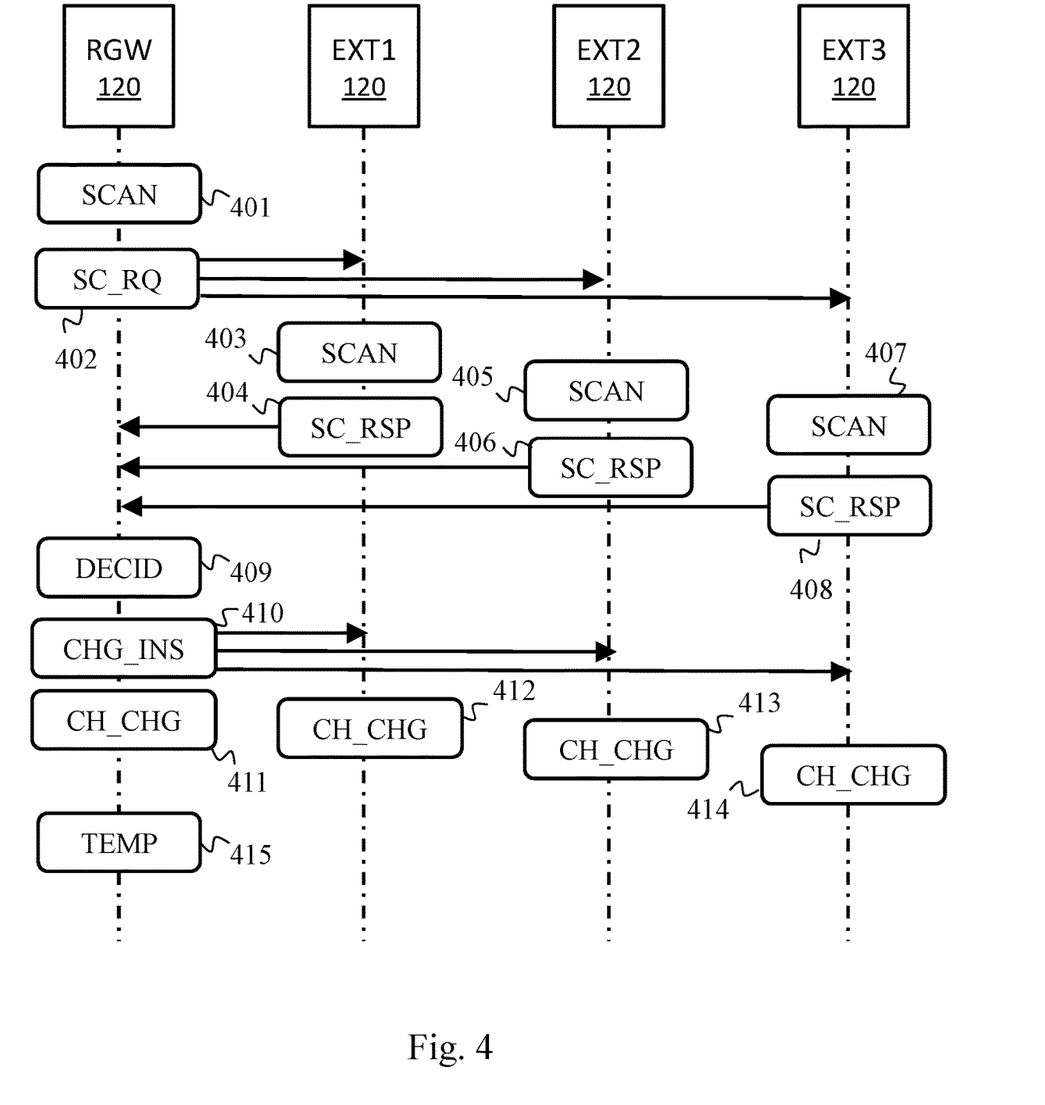
FIG. 4 illustrates schematically a third example of exchanges in the context of a selection of a communication channel in the wireless communication network of FIG. 1.

FIG. 4 illustrates schematically another example of exchanges in the context of a selection of a communication channel in the wireless local area network WLAN 100. More particularly, the exchanges in FIG. 4 take place in the context of a selection of a communication channel to be used for supporting the backhaul network, when the master node device assesses that another communication channel would, from its point of view, be more adapted for supporting the backhaul network and/or a fronthaul network operating on the same channel as said backhaul network in the light of the transmission conditions (sending and/or receiving) of its radio environment.

Like the other node devices of the backhaul network, the master node device regularly makes evaluations of transmission conditions (sending and/or receiving) of its radio environment. Thus, in a step 401, the residential gateway RGW 110 preferentially performs a scan of its radio environment, as already described. Then the residential gateway RGW 110 calculates the score $S_i$ attributed to each communication channel i available to its radio interface WLAN_IF2 112. If the communication channel Ch_b currently used for the backhaul network shows a score higher than or equal to that of each of the other communication channels evaluated, the residential gateway RGW 110 waits until it has to reiterate the evaluations of transmission conditions (e.g. scanning operation). Let us consider that, as in the context of FIGS. 3A and 3B, at least one other communication channel shows a score higher than the communication channel currently being used for supporting the backhaul network. Then, in a step 402, the residential gateway RGW 110 interrogates the other node devices of the backhaul network to evaluate the pertinence of a change of communication channel used by the backhaul network. To do this, the residential gateway RGW 110 transmits the message SC_RQ to them, as already described. Then the extenders EXT1, EXT2 and EXT3 120 make the evaluations of transmission conditions (e.g. scanning operation) of their radio environment and make the calculations of corresponding scores in respective steps 403, 405 and 407. In steps 404, 406 and 408, the extenders EXT1, EXT2 and EXT3 120 transmit respectively to the residential gateway RGW 110 the responses SC_RSP including the scores for the communication channels concerned, as already described.

In a step 409, the master node device decides, according to the scores obtained, to change or not the communication channel used for supporting the backhaul network. If the master node device decides not to change communication channel, the exchanges are interrupted here, until any node device of the backhaul network detects that another communication channel is more adapted than the one currently being used for supporting the backhaul network. The master node device can apply a time delay to itself (step 415) during which the residential gateway RGW 110 refrains from taking the initiative with a new evaluation of change of communication channel used for supporting the backhaul network. If the master node device decides to change communication channel, the residential gateway RGW 110 then transmits, to each other node device in the backhaul network, in a step 410, the message CHG_INS instructing to change communication channel and to switch onto the target communication channel that said master node device has adopted. In a step 411, the residential gateway RGW 110 configures its radio interface WLAN_IF2 112 to communicate via said target communication channel adopted. The extenders EXT1, EXT2 and EXT3 120 do likewise in respective steps 412, 413 and 414. The master node device can then apply to itself, or not, the time delay of step 415.

An alternative to FIG. 4 is that the master node device transmits internally a message CHG_REQ, when it wishes to initiate an evaluation of change of communication channel for supporting the backhaul network. The resulting concatenation of steps then being easily derivable from the description of FIGS. 3A and 3B.

In a particular embodiment, the master node device exchanges with the other node devices of the backhaul network in order to harvest information on the abilities to measure such and such a metric. The master node device can thus select the metrics applicable for the calculations of scores according to this invention. The master node device then informs the other node devices of the backhaul network about the metrics to be used for the calculations of scores. This makes it possible to define dynamically which metrics to use in a context where the node devices of the backhaul network are of various designs.

In a particular embodiment, conversion tables for scaling are used by the master node device. When the master node device examines a score calculated by a node device of the backhaul network, the master node device performs, by means of the conversion tables, a scaling of the score in order to ensure that all the scores are calculated on the same reference frame. In this case, each node device that transmits a score to the master node device indicates, in association with said score, a minimum value and a maximum value that are possible for said score. This makes it possible to use radio interfaces that monitor their metrics and perform the calculations of scores in various ways.

The invention claimed is:

1. A method for selecting a communication channel in a wireless communication network comprising a backhaul network interconnecting node devices and intended to extend a radio coverage of a wireless fronthaul network by using a plurality of access points of the wireless fronthaul network, wherein a same first communication channel, selected by a master node device of the backhaul network, is used in the backhaul network to interconnect said node devices, wherein the method causes each node device of the backhaul network to perform:
 making an evaluation of transmission conditions of its radio environment, and
 calculating, for each communication channel available to said node device, a score representing a quality of transmission via said node device according to the evaluation made, and
 wherein, when, from the point of view of a said node device of the backhaul network, at least one second communication channel shows a better score than the first communication channel, the method causing the master node device to perform:
  obtaining, from each node device of the backhaul network, the score of the first communication channel and the score of at least one said second communication channel, to make an evaluation of change of communication channel; and
  deciding to change, or not, communication channel used in the backhaul network, according to the scores obtained.

2. The method according to claim 1, wherein, following the evaluation of transmission conditions of its radio environment, when a node device other than the master node device assesses that at least one second communication channel shows a better score than the first communication channel, the node device in question transmits to said master node device a message requesting change of communication channel including at least an identifier of said at least one second communication channel that obtained the better score and its score, as well as the score obtained by the first communication channel,
 and wherein the master node device sounds each of the node devices of the backhaul network other than the one that transmitted said message to request change of communication channel in order to obtain the score of each communication channel to which the message requesting change of communication channel refers.

3. The method according to claim 1, wherein the score $S_i$ attributed to each communication channel i is a weighted sum of marks $n_{i,j}$ attributed to various metrics j following the evaluation of the transmission conditions of the radio environment with respect to said communication channel i, using predetermined weights $\alpha_{i,j}$ serving to privilege one metric rather than another for the communication channel i, so that:

$$S_i = \sum_j \alpha_{i,j} \cdot n_{i,j}$$

with $$\forall i, \forall j, \sum_j \alpha_{i,j} = 1.$$

4. The method according to claim 3, wherein, when a metric is not observable for the communication channel i, a maximum mark is attributed to said metric, or said metric is taken out of the score calculation without adjusting the weight of the other metrics, or said metric is taken out of the score calculation while proportionally adjusting the weights of the other metrics in order to ensure that the sum thereof is equal to 1.

5. The method according to claim 3, wherein the metrics are selected from:
 an ambient noise level for the communication channel i,
 a quantity of access points detected on the communication channel i, apart from access points of the backhaul network,
 a proportion of the time where the communication channel i is seen as free,
 a proportion of packets retransmitted,
 a quantity of access points, apart from access points of the backhaul network, using a communication channel adjacent to the communication channel i,
 a quantity of access points, apart from access points of the backhaul network, detected with a power above a predetermined threshold.

6. The method according to claim 1, wherein the master node device determines the gain or loss $\delta_{c \to t}(k)$, for each node device k, in switching from the first communication channel c to a target second communication channel t in the following manner:

$$\delta_{c \to t}(k) = s_t(k) - s_c(k)$$

where $s_t(k)$ is the score for the first communication channel c and $s_t(k)$ is the score for the target second communication channel t.

7. The method according to claim 6, wherein the master node device estimates the gain or the loss in using the target second communication channel t in place of the first communication channel c for the whole of the backhaul network, by means of a cost function as follows:

$$\Delta_{c \to t} = \sum_k \gamma_k \delta_{c \to t}(k) = \sum_k \gamma_k (s_r(k) - s_c(k))$$

where $\gamma_k$ are weighting coefficients defined in order to take into account the type of traffic taking place on the first communication channel c, as reported by each node device k of the backhaul network.

8. The method according to claim 1, wherein, when the master node device has decided to change, or not, communication channel for the backhaul network, the node device that initiated the evaluation of change of communication channel triggers a time delay, during which it is not enabled to initiate a new evaluation of change of communication channel.

9. A method for selecting a communication channel in a wireless communication network comprising a backhaul network interconnecting node devices and intended to extend a radio coverage of a wireless fronthaul network by using a plurality of access points of the wireless fronthaul network,
- wherein a same first communication channel, selected by a master node device of the backhaul network, is used in the backhaul network to interconnect said node devices,
- wherein the method causing a node device of the backhaul network other than the master node device to perform:
- making an evaluation of transmission conditions of its radio environment,
- calculating, for each communication channel available to said node device, a score representing a quality of transmission via said communication channel according to the evaluation made,
- when at least one second communication channel shows a better score than the first communication channel, initiating, with said master node device, an evaluation of change of communication channel in favour of said at least one second communication channel;
- awaiting a decision of the master node device to change, or not, communication channel used in the backhaul network.

10. Computer program product comprising instructions for implementing, by a processor, the method according to claim 9, when said program is executed by said processor.

11. Information storage medium storing a computer program comprising instructions for implementing, by a processor, the method according to claim 9, when said program is read and executed by said processor.

12. A method for selecting a communication channel in a wireless communication network comprising a backhaul network interconnecting node devices and intended to extend a radio coverage of a wireless fronthaul network by using a plurality of access points of the wireless fronthaul network, wherein c a same first communication channel, selected by a master node device of the backhaul network, is used in the backhaul network to interconnect said node devices, wherein the method causing the master node device to perform:
- making an evaluation of transmission conditions of its radio environment, and
- calculating, for each communication channel available to said master node device, a score representing a quality of transmission via said communication channel according to the evaluation made, and
- wherein, when, from the point of view of the master node device or of another node device of the backhaul network, at least one second communication channel shows a better score than the first communication channel, the method causing the master node device to perform:
- obtaining, from each other node device of the backhaul network, the score of the first communication channel and the score of at least one said second communication channel, to make an evaluation of change of communication channel; and
- deciding to change, or not, communication channel used in the backhaul network according to the scores obtained.

13. A node device, intended to be used in a wireless communication network comprising a backhaul network interconnecting said node device with other node devices and intended to extend a radio coverage of a wireless fronthaul network by using a plurality of access points of the wireless fronthaul network,
- wherein a same communication channel, selected by a master node device of the backhaul network, is used in the backhaul network for interconnecting said node devices,
- wherein the node device comprises circuitry causing the lode device perform:
- making an evaluation of transmission conditions of its radio environment,
- calculating, for each communication channel available to said node device, a score representing a quality of transmission via said communication channel according to the evaluation made,
- when at least one second communication channel shows a better score than the first communication channel, initiating, with said master node device, an evaluation of change of communication channel in favour of said at least one second communication channel; and
- awaiting a decision of said master node to change, or not, communication channel used in the backhaul network.

14. The wireless communication network comprising a backhaul network interconnecting node devices according to claim 13, for extending a radio coverage of a wireless fronthaul network by using a plurality of access points of the wireless fronthaul network.

15. A master node device, intended to be used in a wireless communication network comprising a backhaul network interconnecting node devices and intended to extend a radio coverage of a wireless fronthaul network by using a plurality of access points of the wireless fronthaul network,
- wherein a same first communication channel, selected by the master node device, is used in the backhaul network for interconnecting said node devices,
- wherein the master node device comprises circuitry causing the master node device to perform:
- making an evaluation of transmission conditions of its radio environment;
- calculating, for each communication channel available to said master node device, a score representing a quality of transmission via said communication channel according to the evaluation made, and
- when, when, from the point of view of the master node device or of another node device of the backhaul network, at least one second communication channel shows a better score than the first communication channel, the master node device further comprises circuitry causing the master node device to perform:
- obtaining, from each other node device of the backhaul network, the score of the first communication channel and the score of at least one said second communication channel, for making an evaluation of change of communication channel; and
- deciding to change, or not, communication channel used in the backhaul network according to the scores obtained.

16. The wireless communication network comprising a master node device according to claim 14, for extending a radio coverage of a wireless fronthaul network by using a plurality of access points of the wireless fronthaul network.

\* \* \* \* \*